United States Patent
Karlov et al.

(10) Patent No.: US 8,411,740 B2
(45) Date of Patent: Apr. 2, 2013

(54) SYSTEM AND METHOD FOR LOW BANDWIDTH DISPLAY INFORMATION TRANSPORT

(75) Inventors: Yury Karlov, Taganrog (RU); Nikolay Kovach, Taganrog (RU)

(73) Assignee: nComputing Inc., Redwood City, CA (US)

( * ) Notice: Subject to any disclaimer, the term of this patent is extended or adjusted under 35 U.S.C. 154(b) by 1051 days.

(21) Appl. No.: 12/207,389

(22) Filed: Sep. 9, 2008

(65) Prior Publication Data

US 2009/0066840 A1    Mar. 12, 2009

Related U.S. Application Data

(60) Provisional application No. 60/971,213, filed on Sep. 10, 2007.

(51) Int. Cl.
*H04N 11/02*    (2006.01)

(52) U.S. Cl. ............... 375/240.02; 375/240.01; 345/85

(58) Field of Classification Search ............ 375/240.01, 375/240.02; 345/545, 549
See application file for complete search history.

(56) References Cited

U.S. PATENT DOCUMENTS

| | | | | |
|---|---|---|---|---|
| 5,172,237 A | * | 12/1992 | Blonstein et al. | 382/166 |
| 5,949,409 A | * | 9/1999 | Tanaka et al. | 345/549 |
| 7,542,509 B2 | * | 6/2009 | Dambrackas | 375/240.01 |
| 2006/0114539 A1 | * | 6/2006 | Childers | 359/196 |
| 2007/0226522 A1 | * | 9/2007 | Aleksic et al. | 713/300 |
| 2007/0242008 A1 | * | 10/2007 | Cummings | 345/85 |
| 2009/0102850 A1 | * | 4/2009 | Liang et al. | 345/545 |

OTHER PUBLICATIONS

Owens, "A Survey of General-Purpose Computation on Graphics Hardware", 2007, CiteSeer.IST, vol. 26, pp. 80-113.*

* cited by examiner

*Primary Examiner* — Taghi Arani
*Assistant Examiner* — Gregory Lane
(74) *Attorney, Agent, or Firm* — Schwegman Lundberg & Woessner, P.A.

(57) ABSTRACT

To conserve communication channel bandwidth, video information must often be compressed in low bandwidth environments. To significantly reduce bandwidth usage, a first disclosed embodiment proposes transmits a reduced color depth image initially and then later transmitting additional color depth information when the image becomes static. In this manner, a reduced color image is displayed when an image is dynamic but a full color image is displayed when the image becomes static. Note that the additional color information is transmitted only when bandwidth is has become less utilized since updated image information is no longer being transmitted since the image has become static. The additional color depth information may be stored in the same buffer or within a different buffer in the receiving system. A second embodiment delays additional color depth information and also spatially reduces the additional color depth information.

12 Claims, 6 Drawing Sheets

SYSTEM AND METHOD FOR LOW BANDWIDTH DISPLAY INFORMATION TRANSPORT

RELATED APPLICATIONS

The present patent application claims the benefit of the U.S. Provisional Patent application entitled "SYSTEM AND METHOD FOR LOW BANDWIDTH DISPLAY INFORMATION TRANSPORT" that was filed on Sep. 10, 2007 and has the Ser. No. 60/971,213.

TECHNICAL FIELD

The present invention relates to the field of video display systems. In particular, but not by way of limitation, the present invention discloses techniques for digitally transmitting video information in an efficient low bandwidth manner such that a video display may be reconstructed at a remote location.

BACKGROUND

Personal computer video display systems have increased in both display resolution and color depth over the years such that just about every personal computer system now features a color display system. While personal computer users once accepted text-only monochrome display systems, now almost every personal computer system employs a high-resolution color graphical display system. High resolution display systems have allowed computer software makers to create rich graphical user interfaces that feature over-lapping windows, pull-down menus, and intuitive graphical icons.

The combination of increased graphical resolution and increased color bit depth means that much more information is required to stored within the computer system, processed by the computer system, and transmitted from the computer system to the computer display system. Thus, with the ever-increasing graphical resolution and color bit depth displays, it has become increasingly difficult to efficiently transmit computer display information from a computer system to a computer display system without requiring a very high-bandwidth communication channel to carry the large amount of digital video information from the main computer system to the computer system's display screen.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in any type of digital video display system including personal computer systems, High-Definition Televisions (HDTVs), and mobile computer systems. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B." "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
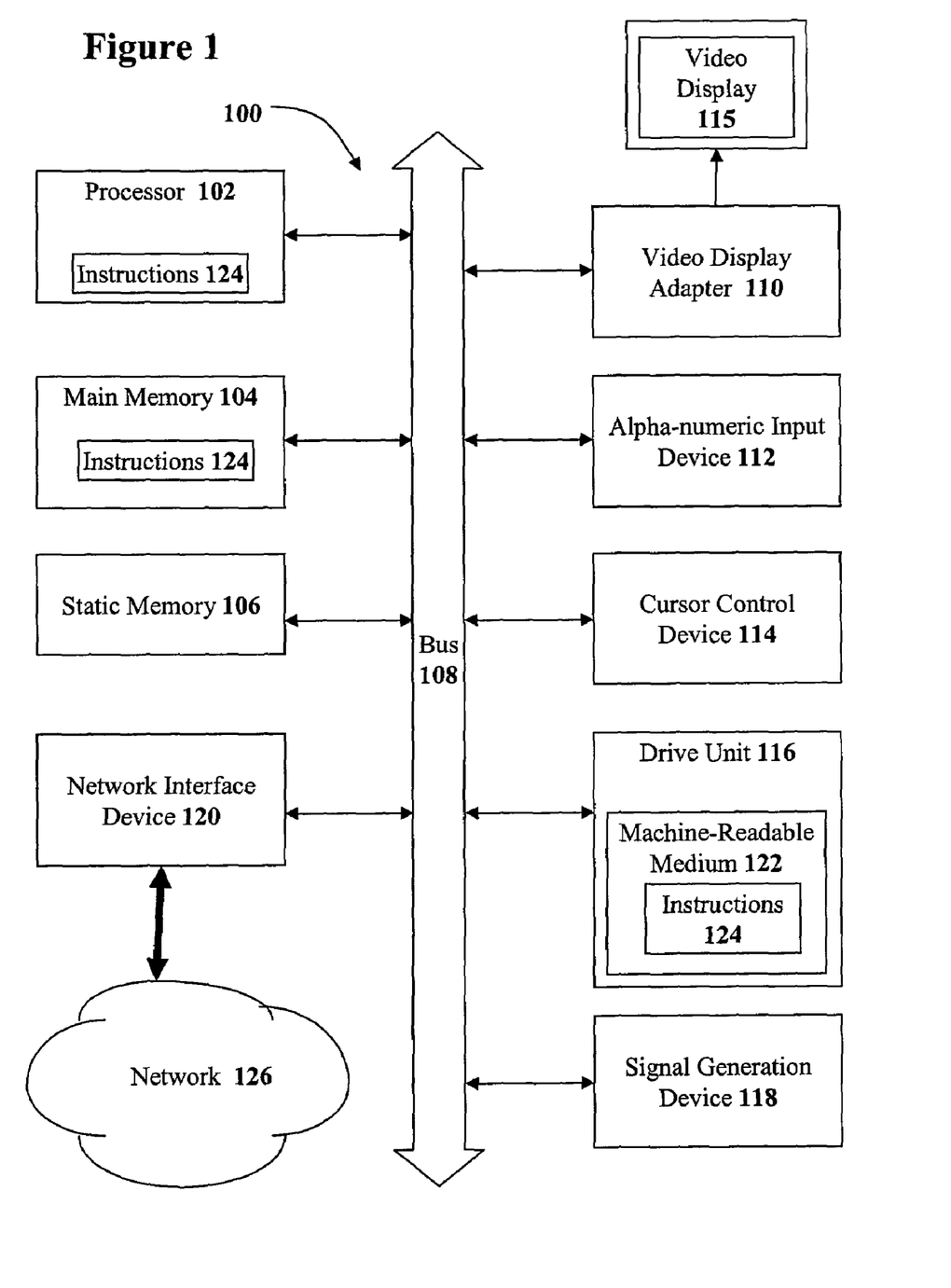
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of machine in the example form of a computer system 100 within which a set of instructions 124, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a network 126 via the network interface device 120 utilizing any one of a number of well-known transfer protocols (e.g., FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, firmware, hardware/circuitry, or a combination of software and hardware.

Computer Video Displays

In a typical personal computer system, such as the computer system 100 of FIG. 1, a video display adapter 110 drives a local video display system 115 such as a Liquid Crystal Display (LCD), a Cathode Ray Tube (CRT), or other video display device. Currently, most personal computer systems are connected with an analog Video Graphics Array (VGA) connection. Many newer personal computer systems are using digital video connections such as Digital Visual Interface (DVI) or High-Definition Multimedia Interface (HDMI). However, all of these types of video display connections from the video display adapter 110 to the local video display system 115 are generally multi-conductor high-bandwidth connections that are only designed for very short distances.

In many situations, it is desirable to reduce the amount of bandwidth required to transmit a video signal. For example, over-the-air terrestrial, satellite, and cable digital video broadcasters desire reduced bandwidth video in order to transmit as many channels of video as possible across their respective video distribution systems. A large amount of research and development has been put into creating compression systems and protocols for compressed digital video for video broadcast systems.

There are additional situations wherein even more highly compressed digital video is needed. For example, many consumer internet connections cannot provide reliable high-bandwidth service such that video compression systems that even further compress video signals are needed to transmit video on the internet. This is often true for even 'broadband' internet connections such as digital subscriber lines (DSL) and cable modems. Furthermore, any systems designed to distribute digital video information on computer data networks should be designed to keep bandwidth usage as low as possible in order not to saturate the data carrying capacity of the computer data network. Thus, the disclosed embodiments introduce a system and method for digitally compressing and transmitting video information in such low bandwidth environments.

Reduced Color Depth

Figure 2:
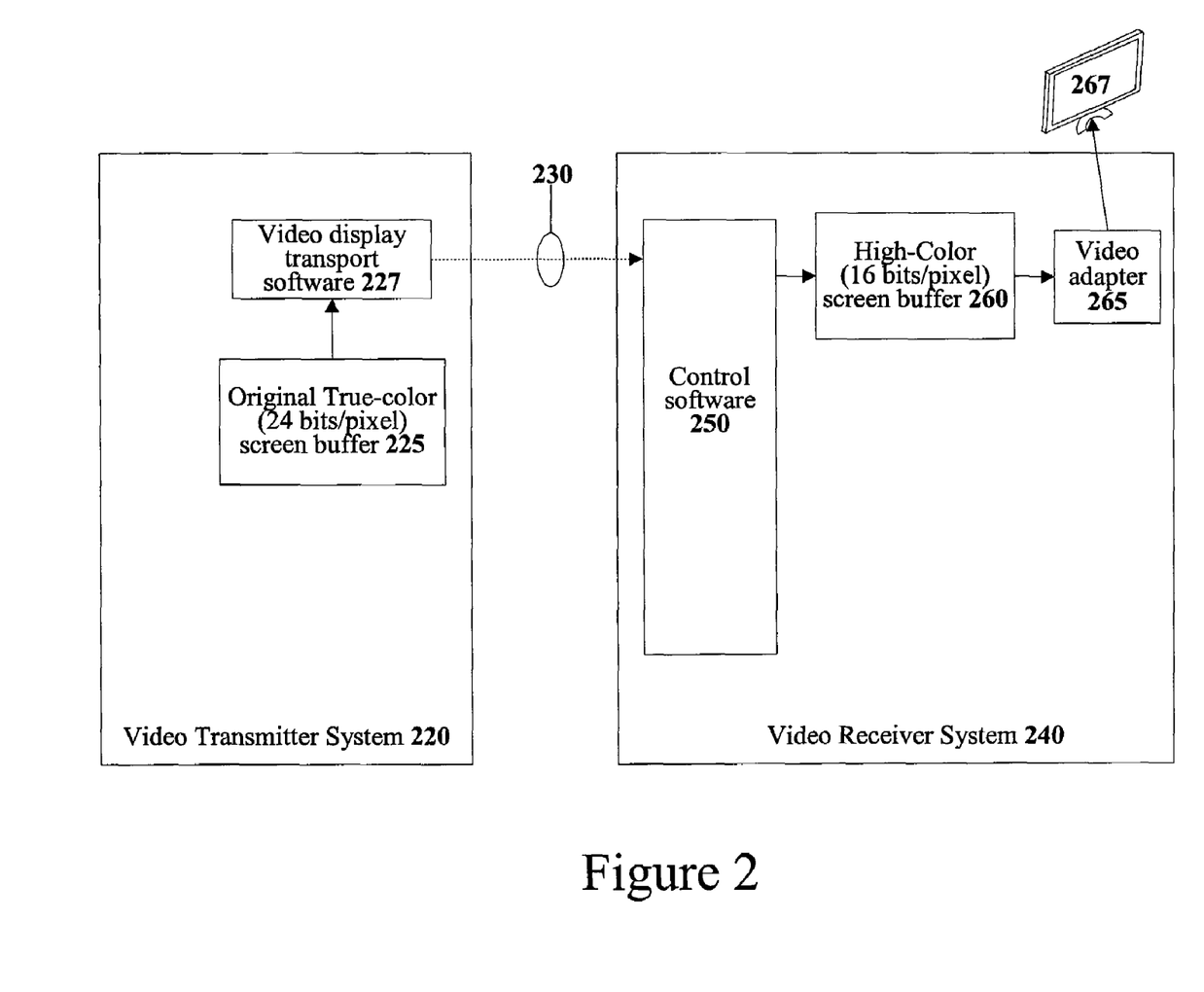
FIG. 2 illustrates a block diagram of a system and method for transmitting video information across a low bandwidth channel by reducing color depth.

One method of reducing the amount of video information that must be transmitted is to reduce the color depth of the video information. FIG. 2 illustrates a video transmission system that employs a reduced color depth method. Referring to FIG. 2, a video transmitter system 220 contains a screen buffer 225 that uses eight (8) bits to represent the red, green, and blue components of each picture element (pixel) such that 24 bits are required for each pixel in the video display. Such 24 bits per pixel display systems are generally known as "true-color" video systems. To reduce the amount of video information that must be transmitted, video display transport software 227 reduces the color depth of the 24 bits/pixel true-color screen buffer 225 to 16 bits per pixel, a format commonly known as "high-color" image display. In the 16 bits per pixel high-color format 5 bits are used to represent red, 6 bits are used to represent green, and 5 bits are used to represent blue. (The extra bit is given to green since the human eye is more sensitive to green light.)

The 16 bits per pixel high-color video information is then transmitted across a communication channel 230 to a video receiver system 240. The communication channel 230 may be Ethernet, wireless, serial, or any communication channel suitable for transmitting digital information. Ideally, the 16 bits per pixel high-color video information should the transmitted in an extensible communication protocol that can be modified in order to add additional features to the communication protocol at a later time.

In the video receiver system 240, control software 250 receives the 16 bits per pixel video information and places that information in a high-color (16 bits per pixel) screen buffer 260. Note that the control software 250 may also handle other type of received data that are distributed to other subsystems (not shown).

A video adapter 265 can then access the video information deposited into the high-color screen buffer 260 to generate a video display signal that drives a local video display device 267 as is well-known in the art. In one embodiment, the connection between the video adapter 265 and the video display 267 is the common analog Video Graphics Adapter (VGA) format.

In one embodiment, the video transmission and display system illustrated in FIG. 2 further reduces bandwidth usage on communication channel 230 by only transmitting video information when changes occur within the true-color screen buffer 225 of the video transmitter system 220. Specifically, video display transport software 227 would only transmit information across the communication channel 230 to the video receiver system 240 when changes are detected within the true-color screen buffer 225. In this manner, there will be no data transmitted across the communication channel 230 for the video transmission system when the image within the original true-color screen buffer 225 is static. Since most computer display systems being used for text display are static the vast majority of the time, an extremely great savings of communication channel bandwidth can be obtained in this manner.

Delayed Color Depth System

The reduced color depth system disclosed in the preceding section has proven to be very effective at reducing the bandwidth needed to transmit digital video information. The system disclosed in the preceding section has been implemented in commercial products and deployed world-wide. However, with the increasing popularity of digital photography and multi-media internet offerings, consumers are increasingly demanding full 24 bits per pixel true-color video display systems. Specifically, some pictures with color gradients will display a noticeable "banding" effect when such pictures are represented in the 16 bits per pixel high-color format. A typical case of banding can be seen in a photograph where a large portion of the photo shows the sky and subtle variations in the sky colors will be reproduced with an unnatural noticeable gradient of different color bands.

Thus, systems for low-bandwidth transmission of full 24 bits per pixel true-color displays needed to be developed. However, since a full 24 bits per pixel true-color display buffer contains fifty percent (50%) more information than a 16 bits per pixel high-color display buffer (8 bits more for each pixel), additional techniques were needed to compress the 24 bits per pixel true-color digital video information in order to keep the bandwidth required to transmit the video very low.

The human eye has well known limitations to its ability to detect and discern colors. For example, when an object is very small (such as a one pixel or a few pixels on a display screen), the human eye cannot detect the color of that small object with great accuracy. Furthermore, when images are moving quickly the human eye and the human brain generally cannot detect small variations in the colors that make up the moving images. These well known limitations of the human ability in detecting colors may be used in order to give the full perception of a 24 bits/pixel color depth when the actual image rendition may only be in 16 bits/pixel color depth much of the time.

To take advantage of these known limitations in human vision, example embodiments introduce a technique of "delayed color depth transmission". With a delayed color depth video transmission system, video image information may initially be transmitted at a reduced color depth. But when the video image information becomes static, the additional color depth information that was initially omitted is then transmitted in order to render a full 24-bits per pixel true-color image. As set forth in the previously disclosed reduced color depth video transmission system, when an images becomes static the system no longer needs to transmit video information (since the receiver already has a full copy of the static image). By waiting until an image is static before transmitting the additional color depth information, a delayed color depth transmission system never increases the maximum amount of bandwidth (peak bandwidth) used by the video transmitter system.

Figure 3:
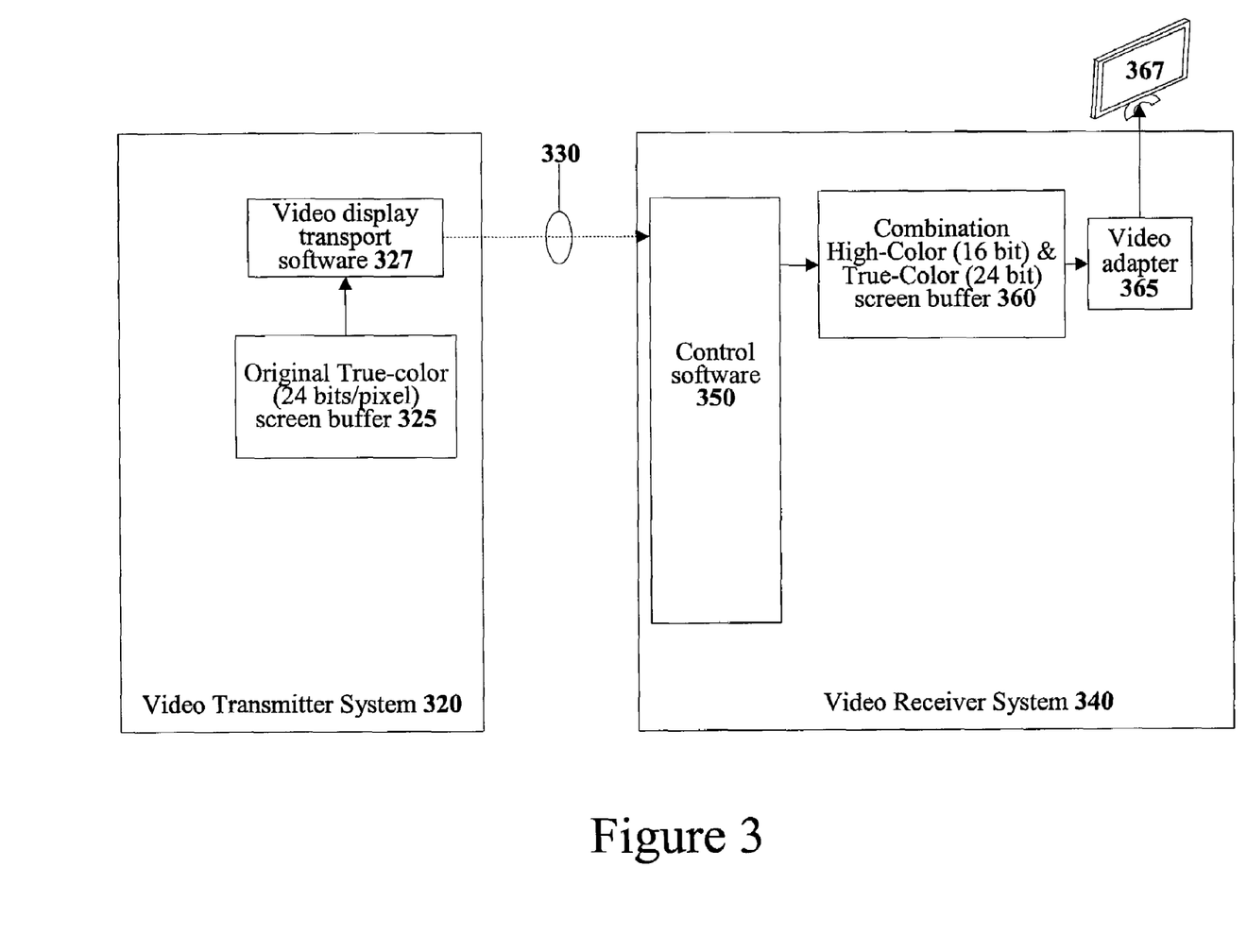
FIG. 3 illustrates a block diagram of a first embodiment system and method for transmitting video information across a low bandwidth channel by delaying full color depth.

A first embodiment of a delayed color depth video transmission system is illustrated in FIG. 3. As with reduced color depth video transmission system illustrated in FIG. 2, the video display transport software 327 first performs a conversion of the 24 bits per pixel true-color frame buffer to a 16 bits per pixel high-color format and transmits that high-color image information across the communication channel 330 to the video receiver system 340. This operation is very fast and uses very few resources. In one embodiment, the same extensible communication protocol used to transmit the color video information in the system of FIG. 2 may be used.

In the video receiver system 340, control software 350 will receive the high-color image information and place that high-color image information into a combination high-color (16 bits per pixel) and true-color (24 bits per pixel) frame buffer 360. With the 16 bits per pixel high-color image information stored in the combination frame buffer 360, video adapter 365 may then generate a video signal to supply to video display system 367 in 16 bits per pixel high-color display mode.

Meanwhile, the video display transport software 327 in the video transmitter system 320 will detect whether the image information within the original true-color screen buffer 325 is changing. If the image information in the original true-color screen buffer 325 is changing rapidly (such as during the rendering of a video or when a user is scrolling or panning quickly) then the video display transport software 327 will remain in high-color (16 bits pixel) display mode where the video display transport software 327 sends updated 16 bits pixel high-color video information to the video receiver system 340.

When the image in the original true-color screen buffer 325 of the video transmitter system 320 stop changing rapidly then the video display transport software 327 may proceed to send the least significant bits that were originally unsent to the video receiver system 340. In this manner, the extra 8 bits per pixel of color information will be sent only when the communication channel 330 between the video transmitter system 320 and the video receiver system 340 will be relatively unused since there will be no motion in the original true-color screen buffer 325 that requires updates of video information to be continually transmitted from the video transmitter system 320 to the video receiver system 340.

When video receiver system 340 receives the additional 8-bits per pixel of color information, the control software 350 will add the additional 8-bits per pixel of color to the existing 16 bits per pixel image already in the combination high-color (16 bits per pixel) and true-color (24 bits per pixel) frame buffer 360 such that the combination high/true-color frame buffer 360 will now have a full 24 bits per pixel (true-color) representation of the image. At that point, the video adapter 365 may proceed to render the full true-color image to video display system 367.

Thus, within milliseconds after motion has stopped in the original true-color screen buffer 325 within the video transmitter system 320, the additional color information will be transmitted to the video receiver system 340 such that the video receiver system 340 can display a full 24 bits per pixel true-color image. This is achieved without exceeding the peak bandwidth usage of the previous reduced color depth video transmission system Since the human eye is not as good as detecting color when things are in motion, the user at video receiver system 340 will be unlikely to notice any lack of color detail while it is in high color mode. The time lapse before sending the extra information related to the 8 additional color bits may vary with the applications. For most applications, a range between 50 to 200 milliseconds is adequate.

It should be noted that the delayed color depth method and system as disclosed above with reference to FIG. 3 remains completely backwards compatible with the high-color only method and system disclosed with reference to FIG. 2. Specifically, a video transmitter system 320 that transmits the additional 8 bits per pixel of color information can be used with a 16 bits per pixel (high-color) only video receiver system 240. This is possible since the control software 250 in the high-color only video receiver system 240 would simply not recognize the data packets containing the additional 8 bits per pixel of color information and simply discard such data packets that carry the additional 8 bits per pixel of color information.

Lossy Delayed Color Depth System

The techniques presented in the preceding section can be even pushed further in order to achieve even lower bandwidth usage while still preserving a high quality image rendering. One method of further extending the system can be achieved by limiting the spatial resolution of the additional color bits that are transmitted. Since some information is discarded, such a system is known as a 'lossy' compression system. A system that employs spatial resolution limiting presents additional hardware savings to the video receiver system as will be set forth below. A full disclosure of this lossy delayed color depth system will be presented with reference to FIGS. 4 and 5.

Figure 4:
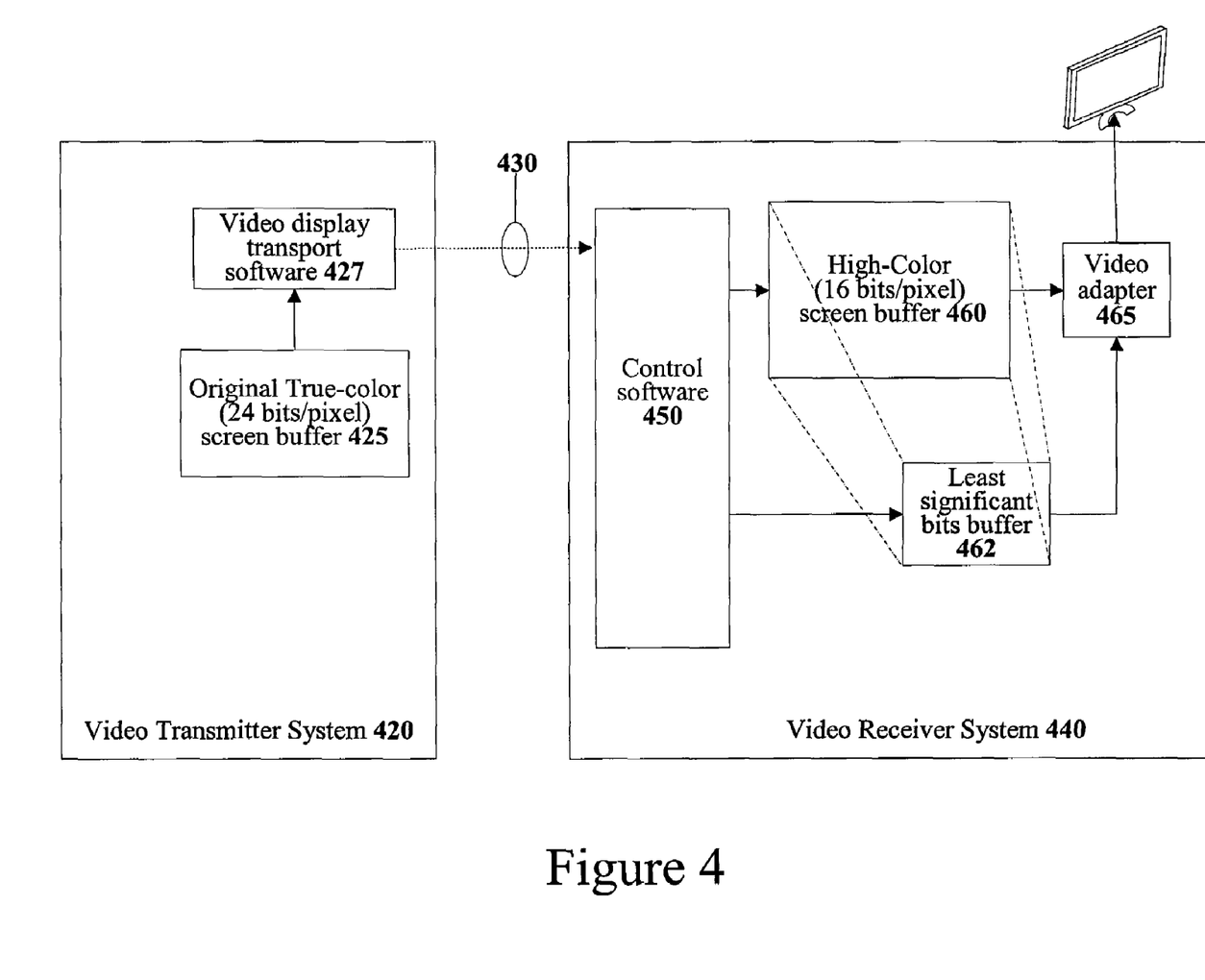
FIG. 4 illustrates a block diagram of a second embodiment system and method for transmitting video information across a low bandwidth channel by delaying full color depth.

FIG. 4 illustrates a video transmitter system 420 very similar to the video transmitter system 320 of FIG. 3. Like the video transmitter system 320 of FIG. 3, the video display transport software 427 performs a conversion of an image in 24 bits/pixel true-color frame buffer 425 to a 16 bits per pixel (high-color) format. The video display transport software 427 then transmits that 16 bits per pixel (high-color) image across the communication channel 430 to a video receiver system 440. Again, the same extensible used to transmit the 16 bits per pixel (high-color) information in the system of FIG. 2 may be used in the system of FIG. 4. The transmitted 16 bits/pixel high-color image information is received in the video receiver and used to fill high-color screen buffer 460. As with preceding system, the additional 8 bits/pixel of color information is not used until the system detects that there is no motion in the image in the original 24 bits/pixel true-color frame buffer 425.

Figure 5:
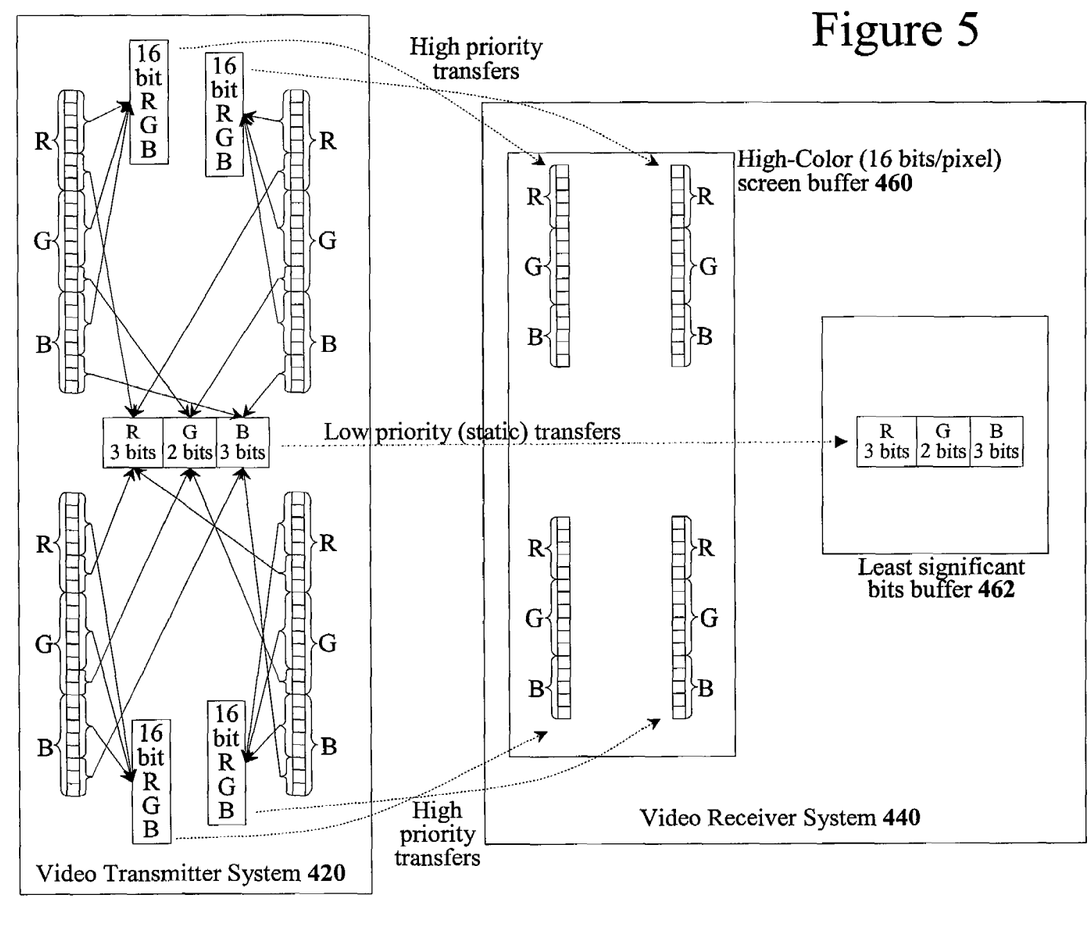
FIG. 5 illustrates a conceptual diagram of the means of spatially reducing the additional color bits in the system of FIG. 4.

However, when the image in the original 24 bits/pixel true-color frame buffer 425 is stable, the video display transport software 427 extracts the additional color information from the original 24 bits/pixel true-color frame buffer 425 and transmits that additional color information in a spatially reduced manner. In one specific embodiment, the spatial reduction is performed by calculating an average for each two by two (2×2) pixel patch to create additional 8 bits of pixel information. However, it should be noted that different spatial resolution reduction methods may be employed that use different sized patches and different shaped patches. FIG. 5 illustrates a conceptual diagram of the spatial reduction using the two by two (2×2) square pixel patch.

Referring to FIG. 5, a true-color two by two (2×2) patch of pixels is illustrated. Each pixel is represented by 24 bits: 8 bits of red, 8 bits of green, and 8 bits of blue. As with the systems disclosed with reference to FIGS. 2 and 3, the most significant bits of each pixel are transmitted in a high-priority basis in order to create a high-color representation of each individual pixel in the high-color screen buffer 460 of the video receiving system. However, the least significant color bits of the two by two (2×2) patch of pixels are averaged together to create an 8 bit additional color representation for the two by two (2×2) patch of pixels. In the embodiment of FIG. 5, the four 3-bit red bits are averaged into a 3-bit average red value, the four 2-bit green bits are averaged into a 2-bit average green value, and the four 3-bit blue bits are averaged into a 3-bit average blue value. This 8-bit value is transmitted for each two by two (2×2) patch of pixels and stored in a least significant bits buffer 462.

Referring back to FIG. 4, the control software 450 stores the 8 bit additional color bit average into least significant bits buffer 462. When control software 450 has received a full set of least significant color average bits into least significant bits buffer 462 then video adapter 465 may proceed to render a 24-bit image using a combination of the high-color image in high-color screen buffer 460 and the least significant color average bits into least significant bits buffer 462. Note that this embodiment does involve the loss of some information and may be referred to as a pseudo-24 bit color system. However, nearby pixels (such as those in the two by two pixel patch) very often have the same least significant color bits such that users will not notice any difference.

Referring to FIG. 4, it should be appreciated that the least significant bits buffer 462 will contain an 8 bit average color value for every four pixels (the two by two pixel patch). Thus, the additional memory required to create the pseudo-24 bit color system of FIG. 4 is only one fourth the size of the additional memory needed to create the full 24 bit color system that is depicted in FIG. 3. Thus, the embodiment of FIG. 4 presents a considerable cost savings in memory over the system of FIG. 3. In the same manner, the added amount of bandwidth used by the system of FIG. 4 to provide pseudo-24 bit color will be nearly one quarter as much added amount of bandwidth used by the system of FIG. 3 to provide full 24 bit color.

An Example Application

Figure 6:
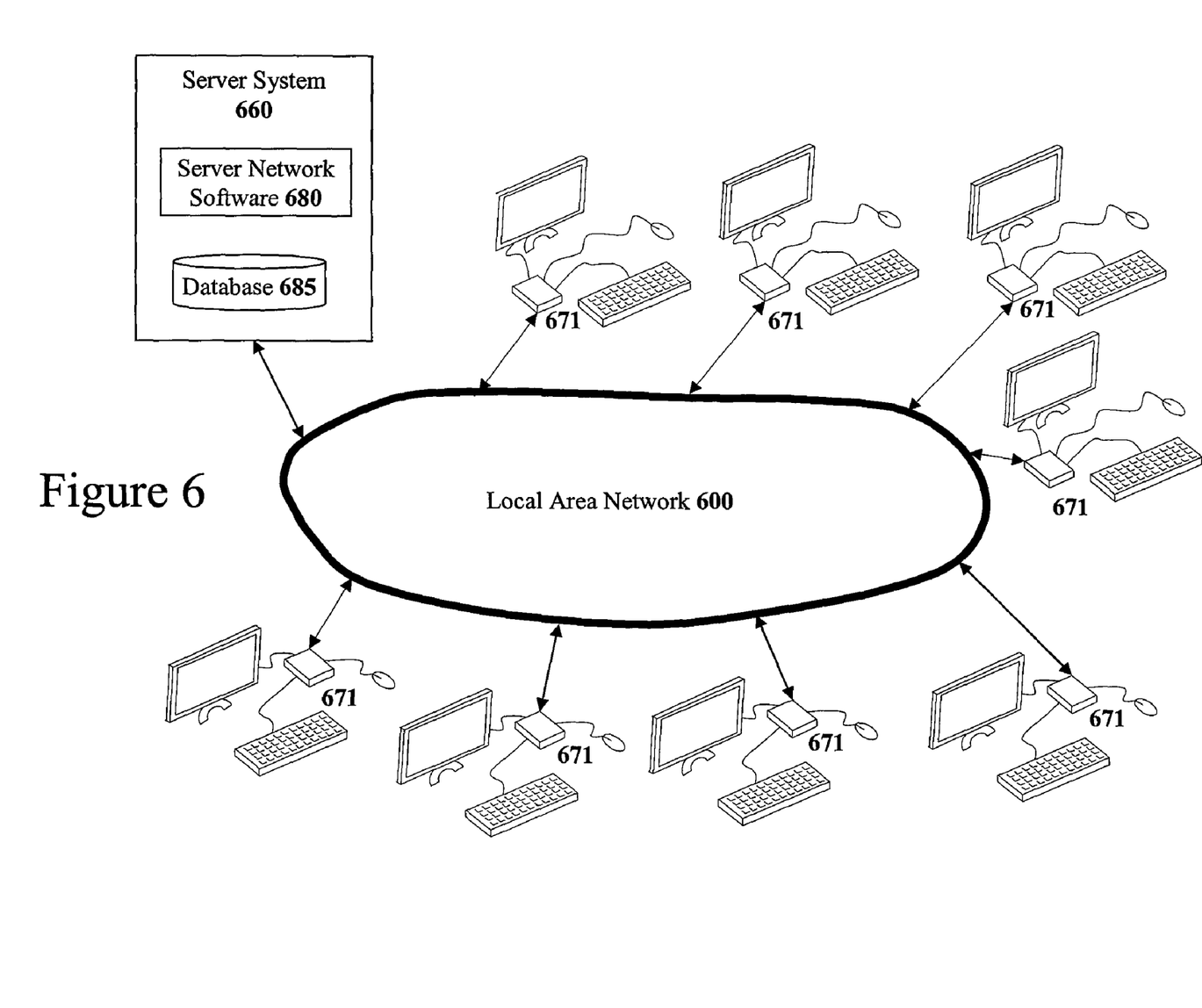
FIG. 6 illustrates a block diagram of a computer network system with a server system and a set of thin-client network nodes that use the teachings set forth with reference to FIGS. 2 to 5.

To reduce the complexity and costs of computer system deployments, server-based thin-client systems have become a popular alternative. FIG. 6 illustrates an example deployment of a server-based thin-client network system. With a server-based thin-client network system, each individual user is given access to a thin-client system 671 that has little computing resources of its own. The individual thin-client systems 671 illustrated in FIG. 6 consist of a display, a keyboard, a cursor control device (such as a computer mouse), and the network-connected thin-client device. Since the thin-client device is not a full-fledged computer system, the thin-client device operates by providing access to computing resources from the server computer system 660 across the local area network 600 to the user of the thin-client system 671.

One method of providing access to the computing resources on the server computer system 660 is to have the individual thin-client systems 671 act as simple terminal devices. Specifically, each thin-client systems 671 transmits its keystrokes and cursor control device movements across the computer network 600 as input to the server computer system 660. Similarly, the server computer system 660 transmits video display information (and sound information) across the network 600 as output to the thin-client systems 671. If a large number of such thin-client systems 671 are coupled to the same network 600, it becomes very important to limit the amount of video information that must be transmitted from the server computer system 660 to the thin-client systems 671 devices or else the amount of video display information traffic on the network 600 to support all the thin-client systems 671 will quickly saturate the capacity of local area network 600. Thus, the low bandwidth requirements of the video transmission systems described in the preceding sections of this document are ideal for such thin-client systems 671.

To implement the video transmission systems illustrated in FIGS. 2, 3, and 4 in a server-based thin-client network environment as illustrated in FIG. 6, the technology of the video transmitter system (220, 320, or 420) is implemented in the server computer system 660 in order to transmit video information to each of the individual thin-client systems 671. Similarly, the technology of the disclosed video receiver system (240, 340, or 440) is implemented in the individual thin-client systems 671.

An additional reason why the video transmission systems of the example embodiments may be ideal for such thin-client systems is that thin-client systems 671 need to be very inexpensive. If the thin-client systems 671 become expensive to manufacture and sell then low end personal computer systems may be used instead. As set forth with the system of FIG. 4, the additional memory needed to implement a 24-bit color system is only the small least significant bits buffer 462 that consist of an 8 bit plane that is one fourth the size of the display screen resolution.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of transmitting digital video information, said method comprising:
   transmitting a reduced color depth version of an original video image to a receiver system;
   rendering a reduced color depth image in said receiver system upon receiving a reduced color depth version;
   detecting when said original video image is substantially static and transmitting additional color bits from said original video image when said original video image is static; and
   rendering a full color depth image in said receiver system upon receiving said additional color bits,
   wherein said additional color bits comprise a spatial reduced version; and
   wherein said spatial reduced version comprises an average of a two by two pixel patch.

2. The method of transmitting digital video information as set forth in claim 1 wherein rendering said full color depth image comprises rendering an image from a reduced color image buffer and an additional least significant bits buffer.

3. The method of transmitting digital video information as set forth in claim 1 wherein rendering said full color depth image comprises rendering an image from a single image buffer.

4. A method of receiving and displaying digital video information, said method comprising:
   receiving a reduced color depth version of an original video frame in a receiver system;
   storing said reduced color depth version of said original video frame in a frame buffer in said receiver system;
   rendering a reduced color depth image signal from said reduced color depth version of said original video frame in said frame buffer;
   receiving only additional color bits from said original video image when said original video image is static; and
   rendering a full color depth image from said reduced color depth version of said original video frame in said frame buffer and said additional color bits,
   wherein said additional color bits comprise a spatial reduced version; and
   wherein said spatial reduced version comprises an average of a two by two pixel patch.

5. The method of receiving and displaying digital video information as set forth in claim 4 further comprising:
   storing said additional color bits in an additional least significant bits buffer in said receiver;
   wherein rendering said full color depth image comprises rendering an image from said reduced color depth version of said original video frame in said frame buffer and said additional color bits stored in said additional least significant bits buffer.

6. The method of receiving and displaying digital video information as set forth in claim 4 further comprising:
   storing said additional color bits in said frame buffer in said receiver to construct a full color image in said frame buffer;
   wherein rendering said full color depth image comprises rendering an image from said frame buffer.

7. An apparatus for receiving and displaying digital video information, said apparatus comprising:
   a combination frame buffer device, said combination frame buffer device capable of storing a reduced color depth image or a full color image;
   a video adapter for rendering an image from said combination frame buffer device, said video adapter rendering a reduced color depth color image signal when said frame buffer device contains said reduced color depth image, said video adapter rendering a full color image signal when said frame buffer device contains said full color image; and
   control software for receiving video information transmitted from a video transmitter system via a network and storing said video information in said frame buffer device, said video information being transmitted at a rate less than or equal to a number of bits in said reduced color depth image, said control software creating said reduced color depth image in said frame buffer device upon receiving a reduced color depth version of an original video frame, said reduced color depth version of said original video frame being transmitted by said video transmitter system when said original video frame is changing, said control software creating said full color image in said frame buffer device upon receiving additional color bits by adding said additional color bits to said reduced color depth image, said additional color bits being transmitted by said video transmitter system when said original video frame is substantially static, wherein said additional color bits comprise a spatial reduced version; and wherein said spatial reduced version comprises an average of a two by two pixel patch.

8. An apparatus for receiving and displaying digital video information, said apparatus comprising: a frame buffer device; a least significant bits buffer; a video adapter for rendering a image signal, said video adapter rendering a reduced color depth color image signal from said frame buffer device when said least significant bits buffer does not contain valid information, said video adapter rendering a full color image signal from said frame buffer device and said least significant bits buffer when said least significant bits buffer contains valid information; and control software for receiving video information transmitted from a video transmitter system via a network and storing said video information in said frame buffer device, said control software creating said reduced color depth image in said frame buffer device upon receiving a reduced color depth version of an original video frame, said reduced color depth version of said original video frame being transmitted by said video transmitter system when said original video frame is changing, said control software creating said full color image in said frame buffer device upon receiving additional color bits by adding said additional color bits to said reduced color depth image, said additional color bits being transmitted by said video transmitter system when said original video frame is substantially static, wherein said additional color bits comprise a spatial reduced version; and wherein said spatial reduced version comprises an average of a two by two pixel patch.

9. An apparatus for transmitting digital video information, said apparatus comprising:

a frame buffer device, said frame buffer device containing image frame information; and video display transfer software, said video display transfer software transmitting a reduced color depth image from said frame buffer device when said image frame information in said frame buffer device is changing rapidly, said video display transfer software transmitting additional color bits from said frame buffer device when said image frame information in said frame buffer device is static such that said additional bits can be combined with previously transmitted reduced color depth image to create a full color image, wherein said additional color bits comprise a spatial reduced version; and wherein said spatial reduced version comprises an average of a two by two pixel patch.

10. An apparatus for receiving and displaying digital video information, said apparatus comprising:

frame buffer device, said frame buffer device capable of storing video image information; video rending means, said video rendering means for rendering a reduced color depth color image when only reduced color depth image information is available, said video rendering means for rendering a full color image when full color image information is available; and control means, said control means for receiving reduced color depth video information transmitted from a video transmitter system via a network and storing said reduced color depth video information in said frame buffer device, said reduced color depth video information being transmitted by said video transmitter system when an original video frame is changing, said control means for receiving and storing additional color bits that may be combined with said reduced color depth video information to create a full color video image, said additional color bits being transmitted by said video transmitter system when said original video frame is substantially static, wherein said additional color bits comprise a spatial reduced version; and wherein said spatial reduced version comprises an average of a two by two pixel patch.

11. The apparatus for receiving and displaying digital video information as set forth in claim 10 wherein said control means stores said additional color bits in said frame buffer to create said full color video image in said frame buffer.

12. The apparatus for receiving and displaying digital video information as set forth in claim 10 further comprising an additional color bits buffer; and wherein said control means stores said additional color bits in said additional color bits buffer and wherein said video rending means renders said full color video image from said frame buffer and said additional color bits buffer.

* * * * *

UNITED STATES PATENT AND TRADEMARK OFFICE
CERTIFICATE OF CORRECTION

PATENT NO. : 8,411,740 B2
APPLICATION NO. : 12/207389
DATED : April 2, 2013
INVENTOR(S) : Karlov et al.

Page 1 of 1

It is certified that error appears in the above-identified patent and that said Letters Patent is hereby corrected as shown below:

On the title page, in column 2, under "(57) Abstract", line 10, before "has", delete "is", therefor In the Claims:

In column 10, line 61, in claim 7, after "color", delete "¶", therefor

In column 11, line 12, in claim 8, after "information,", delete "¶", therefor

In column 11, line 13, in claim 8, after "comprising:", insert --¶--, therefor

In column 11, line 13, in claim 8, after "device;", insert --¶--, therefor

In column 11, line 14, in claim 8, after "buffer;", insert --¶--, therefor

In column 12, line 13, in claim 10, after "information;" insert --¶--, therefor

Signed and Sealed this
Fifteenth Day of October, 2013

Teresa Stanek Rea
*Deputy Director of the United States Patent and Trademark Office*